June 20, 1961 S. A. SCHERBATSKOY 2,989,635
METHOD AND APPARATUS FOR NEUTRON DETECTION
Original Filed Dec. 18, 1953
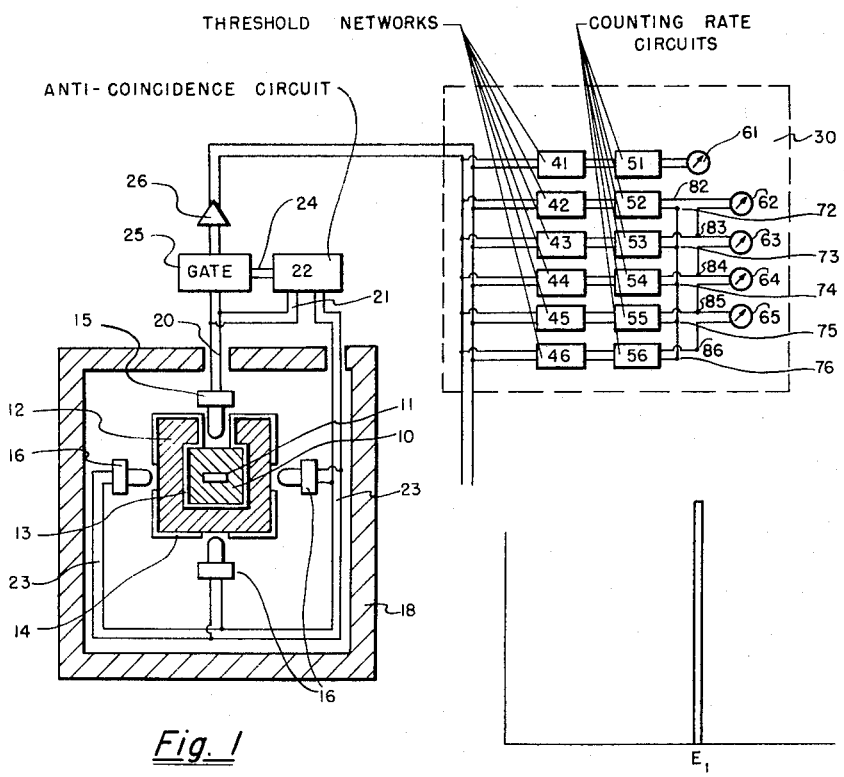
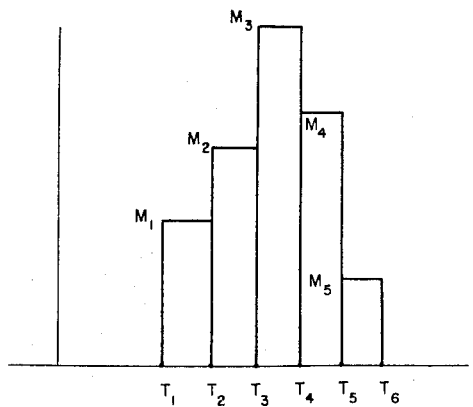
Fig. 1
Fig. 2
Fig. 3
Fig. 4
INVENTOR.
Serge A. Scherbatskoy
By Dorns, McDonald, Williams
& Hersh
Attorney United States Patent Office 2,989,635
Patented June 20, 1961

2,989,635
METHOD AND APPARATUS FOR NEUTRON DETECTION
Serge A. Scherbatskoy, 1220 E. 21st Place, Tulsa, Okla.
Original application Dec. 18, 1953, Ser. No. 399,072, now Patent No. 2,830,189, dated Apr. 8, 1958. Divided and this application Aug. 1, 1957, Ser. No. 675,706
5 Claims. (Cl. 250—71.5)

This invention relates to a method and apparatus for the detection and measurement of radiation, and particularly to the detection and measurement of neutrons. The present application is a division of my copending application Serial No. 399,072, entitled "Neutron Detectors," filed Dec. 18, 1953, and which matured on Apr. 8, 1958, as U.S. Patent No. 2,830,189.

As is well known, the detecting element of a scintillation counter consists of a suitably chosen crystal such as anthracene, cadmium tungstate, or sodium iodide, commonly designated as "phosphor," that is adapted to scintillate, i.e., to convert the incoming radiation such as photons or corpuscular radiation into light impulses. In traversing the crystal the particle to be detected loses its energy in exciting and ionizing the molecules of the crystal. These molecules then radiate energy in the form of fluorescent light, some of which is collected on the photocathode of the multiplier tube.

It is well known that some crystals such as sodium iodide respond only to electrons and gamma rays and do not respond to corpuscular radiations such as neutrons, protons, alpha rays, etc. On the other hand, crystals such as anthracene respond not only to light particles such as electrons, but also to heavy particles such as protons and alpha rays. However, the efficiency of the detector is smaller for particles of larger mass. Thus the light impulses, and consequently the electrical impulses resulting from these three radiations, are substantially in the ratio 9:2:1, i.e., the impulse caused by an electron is about nine times larger than the impulse caused by a proton of the same energy, and the impulse caused by a proton is about two times larger than the one caused by an alpha particle of the same energy.

This invention is concerned, among other things, with the measurement of a stream of neutrons in a background of gamma radiation, and since most crystals were more responsive to gamma radiation than to neutrons, such measurements were not heretofore possible.

An important object of the present invention is to provide a method and apparatus for measuring the energy distribution of neutrons in a heteroenergetic beam. In the present invention, this object is achieved even when the neutron beam is accompanied by a background of gamma rays.

Further objects and advantages of the present invention will become apparent as the following description proceeds, and the features of novelty that characterize the invention will be pointed out with particularity in the claims annexed to and forming a part of this specification.

For further details of a specific device embodying the principles of this invention, reference may be had to the accompanying drawing in which:

FIGURE 1 shows a neutron detector embodying the principles of the present invention.

FIG. 2 shows diagrammatically the distribution in energy of recoil protons released in collision with neutrons.

FIG. 3 shows diagrammatically the distribution of a monoenergetic beam of neutrons.

FIG. 4 shows diagrammatically the distribution of protons released by a monoenergetic neutron beam.

Referring now more particularly to FIG. 1, the arrangement shown therein comprises an anthracene crystal 10 provided in its center with a layer of boron 11, said crystal being surrounded by a relatively larger sodium iodide crystal 12. The crystal 10 has its outside surface covered with an aluminum reflector 13, whereas the crystal 12 has its inside surface covered with aluminum reflector 13 and outside surface covered with aluminum reflector 14. The light flashes produced in the crystal 11 are adapted to be transmitted by means of the reflector 13 to a photomultiplier provided with a suitable voltage supply, the combined photomultiplier and voltage supply being designated as 15. Similarly, the light flashes produced in the crystal 12 are adapted to be transmitted by means of reflectors 13, 14 to one or more photomultipliers 16 (provided with voltage supplies), said photomultipliers 16 being connected in parallel.

The crystals 10 and 12 are optically separated by the aluminum layer 13. Thus a light flash in the crystal 10 does not affect the photomultipliers 16 and the light flash in the crystal 12 does not affect the photomultiplier 15.

The detector is surrounded by a tungsten shield 18, the purpose of which is to shield the detector from soft gamma rays and X-rays.

The output of the photomultiplier 15 is connected through leads 20 and 21 to one of the input channels of an anticoincidence circuit 22, the other input channel of said circuit being connected to the output of the photomultipliers 16 through leads 23. The anticoincidence circuit is adapted to produce a current pulse across its output leads 24 whenever a pulse is produced in the output of the photomultiplier 15, but there is no simultaneous pulse in the output of any of the photomultipliers 16. Anticoincidence circuits are well known in the art and for their description see, for instance, E. Segre, "Experimental Nuclear Physics," John Wiley & Sons, New York, N.Y., 1953, pp. 104–108.

The output of the anticoincidence circuit is adapted to control a gate 25, said gate having its input connected to the photomultiplier 15 and its output connected to an amplifier 26. The gate is normally closed, i.e., it does not permit the output of the photomultiplier 15 to be transmitted to the amplifier 26. However, whenever a pulse appears in the output leads 24 of the anticoincidence circuit, the gate is adapted to transmit the output of the photomultiplier 15 to the amplifier 26.

The operation of this is based on the fact that the anthracene crystal 10 is responsive both to gamma rays and neutrons, i.e., we obtain in the output of the photomultiplier 15 a current pulse in response to a neutron or to a gamma ray, whereas the sodium iodide crystal 12 does not respond to neutrons and responds only to gamma rays, i.e., we obtain in the output of the photomultipliers 16 a current pulse in response to a gamma ray only.

Assume now that the detector is exposed to radiation comprising a mixture of gamma rays and neutrons, said neutrons cover a wide energy range extending from several m.e.v. down to thermal value, i.e., to 0.025 e.v. It is our purpose to eliminate from our recording the background of gamma rays and we shall consider separately various interaction processes between neutrons and gamma rays and the scintillation crystal.

An incoming thermal neutron interacts with the boron layer 11 causing emission into the crystal 10 of an alpha particle of an energy approximately 2.5 m.e.v. The alpha particle slows down in the crystal 10 producing ionization and excitation of the surrounding atoms, thus causing a flash of light in the crystal and a corresponding current impulse in the photomultiplier 15. The energy of the alpha particle has been absorbed completely in the crystal 10 and there is no simultaneous occurrence of a pulse in any of the photomultipliers 16. Consequently, whenever a thermal neutron is intercepted by the detector we obtain a pulse across the output leads of the anticoincidence circuit which in turn actuates the gate 25 and allows the output pulse of the photomultiplier 15 to be transmitted to the recorder 30, said output pulse having a definite magnitude representing the energy of the alpha particle released during the interaction between the thermal neutron and boron.

An incoming fast neutron strikes one of the atoms of the anthracene crystal 10 such as hydrogen, in which case the nucleus of hydrogen recoils as proton, thus producing a pulse of light in the crystal 10, said light producing in turn a current impulse in the output of the photomultiplier 15. The incoming neutron is in turn scattered by the crystal 10 and the scattered neutron escapes from this crystal and traverses the crystal 12. Since the crystal 12 is a sodium iodide, no interaction takes place and, therefore, there is no simultaneous occurrence of a pulse in the output of any of the photomultipliers 16. Consequently, whenever a fast neutron is intercepted by the detector we obtain a pulse in the photomultiplier 15 and there is no simultaneous occurrence of a pulse in the output of any of the photomultipliers 16. Thus a pulse appears across the output leads of the anticoincidence circuit 22 which in turn actuates the gate 25 and allows the output pulse of the photomultiplier 15 to be transmitted to the recorder 30, said output pulse having a definite magnitude representing the energy of the proton knocked out by the incoming neutron during the collision.

The number of photoelectric interactions in the crystal 10 is negligible, since anthracene is comprised of atoms of low atomic number and because of the effect of the shield 18 which absorbs most of the low-energy gamma rays and X-rays.

In the Compton interaction, the incoming photon is scattered by one of the electrons of crystal 10. As a result of such scattering, the electron has acquired kinetic energy, thus producing a pulse of light in the crystal, said light producing in turn a current impulse in the output of the photomultiplier 15. The scattered photon usually escapes from the crystal 10 and interacts with the crystal 12. As a result of such interaction, we obtain in the crystal 12 a flash of light which in turn produces a current pulse in at least one of the photomultipliers 16. Consequently, the Compton effect is characterized by a simultaneous occurrence of pulses in the photomultipliers 15 and 16. Since the anticoincidence network 22 does not respond to simultaneous impulses, the detector is not responsive to gamma rays undergoing Compton effect.

In the process of pair formation, the incoming photon vanishes completely and a positron-electron pair is created in the crystal 10. Both the electron and the positron slow down producing ionization and excitation of surrounding atoms, thus causing a flash of light in the crystal 10 and a corresponding current impulse in the output of the photomultiplier 15. After the positron has been reduced in energy, it makes a unique and final interaction with an orbital electron. In this interaction the pair of positive and negative electrons unite and annihilate themselves in the formation of two photons that are ejected in opposite directions. These photons designated as annihilation quanta interact with the crystal 12 and produce an impulse in the output in at least one of the photomultipliers 16 which is coincident with the impulse in the output of the photomultiplier 15. Since the anticoincidence network 22 does not respond to simultaneous impulses, the detector is not responsive to gamma rays undergoing pair formation.

Since the occurrence of photoelectric effect is very infrequent, it can be assumed that the Compton effect and the pair formation are the only gamma ray interactions that take place. Consequently, the detector does not respond to gamma radiation and we obtain in the output of the amplifier 26 pulses that represent energies of alpha particles caused by thermal neutrons and energies of recoil protons produced by fast neutrons.

The output of the amplifier 26 consists of a succession of discrete pulses. Some of these pulses have uniform magnitude and represent the energy of alpha rays released by thermal neutrons. Other impulses have various magnitudes representing energies of recoil protons released by fast neutrons. These output pulses are simultaneously applied to six threshold networks designated by numerals 41, 42, 43, 44, 45, and 46, respectively. Each network is characterized by two threshold values, i.e., it is arranged to transmit only those impulses, the magnitude of which is below the upper threshold and above the lower threshold.

The threshold networks 41, 42, 43, 44, 45, and 46 are respectively applied to counting-rate circuits 51, 52, 53, 54, 55, and 56, each of said counting-rate circuits producing across its output terminals a D.-C. voltage having magnitude representing the rate of impulses derived from the corresponding threshold network.

The threshold values of the gate 41 are such that it transmits only a very narrow band of impulses corresponding to the energy of an alpha particle released as a result of interaction of slow neutrons with boron. Consequently, the output voltage of the counting-rate circuit 51 indicated on the meter 61 represents the flux of slow neutrons detected by the crystal 10.

Consider now FIG. 2 in which the abscissas represent the threshold values of the networks 42, 43, 44, 45, and 46. Thus $T_1$ and $T_2$ are the lower and upper threshold value of the network 42; $T_2$ and $T_3$ correspond to the network 43; $T_3$ and $T_4$ correspond to the network 44, etc. Let the ordinates represent the corresponding outputs of counting-rate circuits connected to said networks. Thus the length $T_1M_1$ represents the rate of impulses transmitted by the network 42 and comprised within the values $T_1$ and $T_2$, said value $T_1M_1$ being also represented by the D.-C. voltage in the output of the circuit 52. The length $T_2M_2$ represents the rate of impulses transmitted by the network 43 and comprised within the values $T_2$ and $T_3$, said value $T_2M_2$ being also represented by the D.-C. voltage in the output of the circuit 53, etc. Thus, the stepwise curve represents distribution of pulses in the output of the photomultiplier 15. These pulses represent energies of recoil protons knocked out by neutrons in the crystal. Consequently, the stepwise curve represents the energy distribution of recoil protons.

It is our purpose, however, to determine the energy distribution of neutrons and this can be done by considering FIG. 3 and FIG. 4. FIG. 3 represents diagrammatically the energy distribution of a monochromatic beam of fast neutrons (abscissas designate energy and ordinate the density of the distribution). Such a neutron beam when colliding with protons gives rise to an energy distribution shown in FIG. 4, i.e., the density of the distribution is uniform and extends from zero energy up to the energy of the neutron beam.

It is apparent that we may obtain the neutron distribution shown in FIG. 3 by differentiating the proton distribution shown in FIG. 4. This relationship is not limited to the particular distribution of FIG. 4. It is general and may be applied to any proton distribution such as produced in FIG. 2.

The proton distribution shown in FIG. 2 is not continuous, but has a stepwise shape. Since we are dealing here with finite differences rather than infinitesimals, we may obtain the corresponding neutron distribution by subtracting the adjacent ordinates in FIG. 2. Such a process of determining finite differences is analogous to the process of differentiation of a continuous proton distribution and is accomplished by means of the circuit of FIG. 1.

For the purpose of obtaining a measurement of fast neutrons, the outputs of adjacent counting-rate circuits are connected in opposition so as to energize suitable voltmeters. As illustrated, the negative terminals 72, 73, 74, 75, and 76 are all connected in parallel. The terminals 82 and 83 are connected to a voltmeter 62 so that the latter is affected by the difference between the outputs of the counting-rate crcuits 52 and 53.

The outputs of counting-rate circuits 53 and 54 are also connected in opposition, i.e., the negative terminal 73 has the same polarity as the negative terminal 74. Consequently, the difference in the voltages at the terminals 83 and 84 is applied to a voltmeter 63 and represents the difference between the outputs of the counting-rate meters 53 and 54.

Similarly, the outputs of counting-rate circuits 54, 55 and 55, 56 are connected in opposition, thus producing voltages representing differences of outputs of adjacent counting-rate circuits. These voltages are applied to voltmeters 64 and 65. Thus the indication of the meters 62, 63, 64, and 65 give the energy distribution of fast neutrons that interacted with the crystal 10.

It is apparent that various modifications may be made within the scope of my invention. For instance, if we eliminate the boron layer 11 from the arrangement of FIG. 1, we will provide a detector that is selectively responsive to fast neutrons only and irresponsive to the thermal neutrons.

We may also, in a modified embodiment of FIG. 1, retain the anthracene crystal 10 and replace the sodium iodide crystal 12 by another anthracene crystal of the same geometry as the crystal 12. It is apparent that such a modified device will be insensitive to gamma rays for the same reasons as the device of FIG. 1. Furthermore, in such a modified device, fast neutrons of large energy scattered by the crystal 10 interact with the anthracene crystal that replaced the crystal 12. Thus we obtain coincident impulses in the photomultipliers 15 and 16 which do not affect the anticoincident circuit 22. If, however, a fast neutron of small or moderate energy interacts with the crystal 10, the scattered neutron does not have enough energy to produce an appreciable light pulse in the crystal 12 and consequently current impulse across the photomultiplier 16 will be below the noise level. In such a case, we obtain a pulse in the photomultiplier 15 only. This pulse actuates the anticoincidence circuit and is recorded. It is apparent that such an arrangement is selectively responsive to neutrons of moderate and small energies and is insensitive to large energy neutrons and to gamma rays.

I claim:
1. In a neutron spectrometer, a detecting element comprising hydrogenous material and adapted to produce electrical impulses having amplitudes that are substantially proportional to the energies of the protons resulting from the collisions of incident neutrons with said material, a multiple-channel amplitude selective means for producing a plurality of first signals having magnitudes respectively representing the frequency of occurrence of said impulses lying within various amplitude ranges, and a second means fed by said plurality of first signals for comparing their respective magnitudes and producing second signals representing the differences in magnitudes between said respective first signals.

2. In a radiation detecting system, a detecting element adapted to produce electrical impulses having amplitudes that are substantially proportional to the energies of radiation quanta intercepted by said element, an amplitude selective network characterized by three different thresholds for transmitting two groups of impulses, one of said groups transmitting those impulses that are above the first and below the second threshold, and the other group comprising those impulses that are above the second and below the third threshold, and means responsive to said selective network for producing a signal representing the difference in the rate of occurrence of the first group with respect to the second group.

3. In a radiation detecting system, a detecting element adapted to produce electrical impulses having amplitudes that are substantially proportional to the energies of radiation quanta intercepted by said element, an amplitude selective network characterized by three different thresholds for transmitting two groups of impulses, one of said groups transmitting those impulses that are above the first and below the second threshold, and the other group comprising those impulses that are above the second and below the third threshold, a rate meter responsive to the impulses of said first group for producing a first signal representing their rate of occurrence, another rate meter responsive to the impulses of said second group for producing a second signal representing their rate of occurrence, and a means for producing a resultant signal representing the difference between said first and said second signals.

4. In a neutron spectrometer, a detecting element comprising a hydrogenous substance and adapted to produce electrical impulses having magnitudes that are substantially proportional to the energies of protons resulting from the collisions of incident neutrons with said material, an amplitude selective network characterized by three different thresholds for transmitting two groups of impulses, one of said groups comprising those impulses that are above the first and below the second threshold, and the other group comprising those impulses that are above the second and below the third threshold, and means responsive to said selective network for producing a signal representing the difference in the rate of occurrence of the first group with respect to the second group.

5. In a neutron spectrometer, a detecting element comprising a hydrogenous substance and adapted to produce electrical impulses having magnitudes that are substantially proportional to the energies of protons resulting from the collisions of incident neutrons with said material, an amplitude selective network characterized by three different thresholds for transmitting two groups of impulses, one of said groups comprising those impulses that are above the first and below the second threshold, and the other group comprising those impulses that are above the second and below the third threshold, a rate meter responsive to the impulses of said first group for producing a first signal representing their rate of occurrence, another rate meter responsive to the impulses of said second group for producing a second signal representing their rate of occurrence, and means for producing a resultant signal representing the difference between said first and said second signals.

References Cited in the file of this patent
UNITED STATES PATENTS 2,712,081    Fearon et al. _____ June 28, 1955

OTHER REFERENCES

Scintillation Counting With Anthracene, by Bell, P. R., et al., AECD—1889, 6 pages; declassified April 20, 1948.

Neutron Induced Scintillation in Organic Liquids, by Mallory et al., from Review of Scientific Instruments, vol. 23, No. 12, December 1952, pages 769, 770.